Patented July 28, 1936

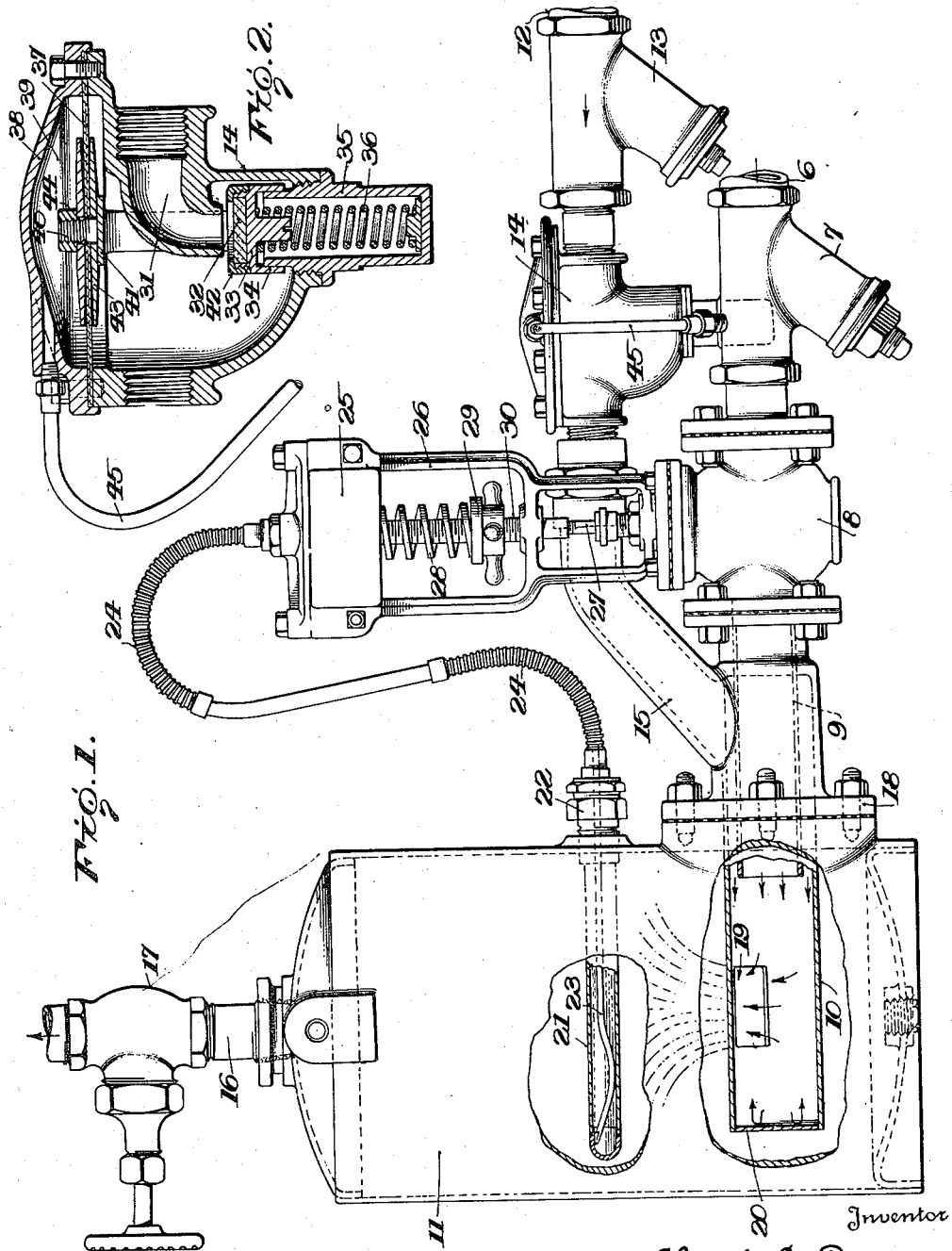

2,049,197

UNITED STATES PATENT OFFICE 2,049,197

FLUID MIXING DEVICE

Lloyd L. Davies, Knoxville, Tenn., Jules V. Resek, Cleveland, Ohio, and William W. Carson, Jr., Knoxville, Tenn., assignors to The Fulton Sylphon Company, Knoxville, Tenn., a corporation of Delaware Original application March 28, 1932, Serial No. 601,624. Divided and this application October 20, 1933, Serial No. 694,500

5 Claims. (Cl. 137—111)

This invention relates to the art of fluid mixing, and more particularly to an apparatus for mixing two or more fluids of different temperatures so as to produce a mixture of said fluids having a substantially constant predetermined temperature. This application is a division of our application Serial No. 601,624, filed March 28, 1932, which has matured into Patent No. 1,942,269, granted January 2, 1934.

In devices of this general character, as for example water mixers wherein cold water is mixed with and heated by hot water, steam or the like, difficulty has hitherto been encountered in producing a mixture the temperature of which will remain substantially constant irrespective of changes in the temperatures, pressures and rates of flow of the fluids being mixed. Such mixtures as are already known perform fairly satisfactorily as long as there are no substantial changes in the pressures and rates of flow of the various fluids supplied to the mixing device, but trouble is often experienced when such changes do occur because of the "hunting" action of the valves which permits alternate slugs of hot and cold fluids to pass through the mixer. Various methods have been suggested for remedying these defects, such as regulating both hot and cold fluid inlet valves from a single thermostat, using a small fixed orifice for one of the inlets and obtaining regulation by a valve in the other inlet, and using a pressure equalizer to maintain the pressures of the fluids supplied equal, but none of these remedies is adequate to produce the desired results under all of the various conditions encountered during practical operation.

It is therefore one of the objects of the present invention to provide a novel and efficient apparatus for mixing a plurality of fluids so as to produce a mixture the temperature of which is accurately maintained, within narrow limits, at a predetermined standard regardless of the differences and changes in the temperatures, pressures and rates of flow of the fluids being mixed.

Another object is to provide a fluid mixing device of novel construction wherein a plurality of fluids are conducted through a portion of said device in parallel streams without mixing and are then thoroughly mixed by reversing the flow of a portion of said fluids so as to produce a great turbulence.

Another object is to provide a fluid mixing device of the character described which is simple and rugged in structure and has a minimum of moving parts, is economical to manufacture and maintain, and is efficient and reliable for the purpose intended.

These and other objects will appear more fully from a consideration of the detailed description of the invention which follows. Although only one embodiment of the present invention is described and illustrated in the accompanying drawing, it is to be expressly understood that this drawing is for the purpose of illustration only and is not to be construed as a definition of the limits of the invention, reference being had for this purpose to the appended claims.

In the drawing, wherein like reference characters indicate like parts in both views:

Fig. 1 is a side elevation, with certain parts broken away, of a fluid mixing device which constitutes one embodiment of the present invention; and Fig. 2 is a side elevation in section of one of the fluid supply valves and its pressure responsive operating means indicated in Fig. 1, the diaphragm cover plate being shown turned through an angle of 90° in the interest of clarity.

Referring now to Figs. 1 and 2, there is shown therein a fluid mixing device to which are supplied a hot and a cold fluid and within which said fluids are so mixed as to produce a fluid mixture the temperature of which is maintained, within narrow limits, substantially constant at a predetermined standard regardless of the initial temperatures and pressures, and the rate of flow of the mixed fluid. Although each fluid supply line is provided with its individual valve, regulation of the supply of both fluids is controlled basically by a single thermostat which is adapted to actuate the valve in one of the supply lines, the other valve being controlled by the differential in pressure between the fluid in the line controlled by the thermostatically operated valve and the fluid mixture within the mixing device. Suitable means are also provided for always maintaining this differential equal to or greater than a predetermined minimum value in favor of the pressure of the fluid in the thermostatically controlled supply line, thereby making possible automatic compensation of the basic control for variations in the pressures and rates of flow of the hot and cold fluids.

The specific form of apparatus disclosed in Figs. 1 and 2, as exemplary of the present invention, comprises a water mixer of the type wherein cold water and a hot fluid, such as hot water or steam, are supplied to a mixing chamber wherein they are thoroughly mixed and the cold water is heated, the resulting mixture being maintained at a substantially constant temperature, the latter being determined by the use to which the mixture is put. As shown, the hot fluid is supplied from any suitable source through a pipe or conduit 6, and passes through a strainer 7, valve 8 and into the inner central tube 9 of a mixing nozzle 10 which is located within and adapted to discharge the mixture of hot and cold fluids into a substantially cylindrical mixing chamber 11. At the same time, cold water is supplied through a pipe or conduit 12 from any suitable source, and passes through a strainer 13, a valve 14 and into a branch pipe 15 of the mixing nozzle assembly, whence it is delivered to the interior of mixing nozzle 10 in the space surrounding central tube 9. The mixture of fluids may be withdrawn from mixing chamber 11 as desired, the outlet therefrom being shown as a pipe or conduit 16 connected to the top of said chamber and controlled by a suitable valve 17.

It is desirable that a substantial part of the mixing of the hot and cold fluids should take place in the mixing nozzle before the fluids pass into the large mixing chamber 11, and to this end mixing nozzle 10 is constructed in a novel manner so as to create great turbulence in the fluids supplied thereto just before they pass into mixing chamber 11. In the form shown, the mixing nozzle assembly is substantially Y-shaped, the two arms of the Y being provided with suitable flanges or other couplings for connection to the outlets from valves 8 and 14, and with suitable means, such as a flange 18, for securing the assembly to mixing chamber 11 adjacent the bottom thereof. Central tube 9, through which the hot fluid is supplied, is substantially coaxial with the cylindrical interior of mixing nozzle 10, and branch pipe 15 is connected adjacent the outer end of the mixing nozzle assembly in such a manner that the flow of the cold fluid supplied therethrough surrounds central tube 9 and becomes substantially coaxial therewith and with the interior of mixing nozzle 10. Since central tube 9 extends inwardly a substantial distance beyond the inlet from branch pipe 15, it is evident that, for a portion of the length of mixing nozzle 10, the hot and cold fluids flow in parallel streams but are prevented from mixing by the wall of central tube 9.

In order to increase the efficiency of the mixing within the portion of mixing nozzle 10 where the hot and cold fluids are in direct contact with one another, it is desirable that a substantial portion of the flowing fluids have its direction of flow abruptly reversed before leaving the mixing nozzle so as to produce great turbulence and a rapid and thorough mixing. To this end, the outlet openings 19 from the interior of mixing nozzle 10 into mixing chamber 11 are located about the periphery of said nozzle and intermediate the inner end of central tube 9 and the closed inner end wall 20 of the nozzle. With this construction, the major portion of the fluids supplied to mixing nozzle 10 through pipe 15 and central tube 9 flows axially the length of the nozzle and upon abutting end wall 20 has its direction of flow suddenly reversed thus causing extreme agitation of the fluids within the mixing nozzle adjacent the outlet orifices 19, and thereby effecting an intimate mixture of the hot and cold fluids before delivery into mixing chamber 11 where the mixing process is completed so as to result in a mixture of uniform temperature throughout.

The supply of both the hot and cold fluids to mixing nozzle 10 is controlled basically by a single thermostat, exposed to the temperature of the fluid mixture within chamber 11, which is suitably connected in a known manner so as to control the movements of valve 8 of the hot fluid supply line. As shown, a thermostat bulb 21, partially filled with a liquid having a low boiling point, is suitably supported, as by a gland 22 threaded into the wall of mixing chamber 11, at a point within the mixing chamber intermediate mixing nozzle 10 and outlet conduit 16, the interior of bulb 21 being connected through a tube 23 having flexible portions 24, if desired, to the interior of a suitable expansible and contractible member housed within a casing 25 which is supported by a framework 26, the latter in turn being mounted on top of the casing of valve 8. A movable wall of the expansible and contractible member housed in casing 25 is secured to the valve stem 27 of valve 8. When the low boiling point liquid within bulb 21 is vaporized by an increase in temperature of the surrounding fluid mixture within mixing chamber 11, the vapor enters the open end of tube 23, passes into the expansible and contractible member, and by expansion of the latter against the force of a suitable spring 28 moves valve stem 27 so as to close valve 8. Upon a decrease in the vapor pressure, due to a lowering of the temperature of the fluid mixture in mixing chamber 11, the expansible and contractible member contracts, aided by the force of spring 28, and reopens valve 8. Suitable means may be provided for adjusting the initial compression of spring 28 so as to predetermine the temperature within mixing chamber 11 which will operate valve 8, such as a nut member 29 against which the lower end of spring 28 bears, said nut member being threaded upon a spindle 30 carried by framework 26 within which valve stem 27 is freely slidable. Since this type of valve operating mechanism is old and well known in the art, it is unnecessary to describe it in further detail, and it will be understood that any other equivalent mechanism may be substituted for the specific form shown.

It will be noted in Fig. 1 that the end of tube 23 within bulb 21 is curved upwardly so that its open end is located above the level of the liquid within the bulb. In thermostatically operated valve devices of this character previously employed, the open end of the tube has been placed below the level of the liquid in the bulb so that a change in temperature forces the liquid itself into, or withdraws it from, the tube and the interior of the expansible and contractible member, this resulting in the valve being opened or closed very rapidly, and, because of its high sensitivity, rendering the valve subject to a "hunting" form of operation. By locating the open end of tube 23, in accordance with the present invention, above the level of the liquid in bulb 21, only vapor enters said tube and the expansible and contractible member, the result being that although the initial movement of the valve occurs just as positively and quickly as in the devices hitherto known, the continued movement of the valve to its open or closed position takes place more slowly, thus overcoming the tendency to "hunt". In order to insure that the thermostat is properly installed within mixing chamber 11 with the open end of tube 23 up, the outer end of bulb 21 or tube 23 may be provided with a suitable marking to indicate the position of the end of said tube within said bulb.

With this construction, it is evident that the movements of valve 8, which controls the supply of hot fluid to mixing nozzle 10 and mixing chamber 11, will vary in proportion to changes in the temperature of the fluid mixture surrounding bulb 21 of the thermostat. However, in order that the temperature of the fluid mixture within said chamber may be maintained substantially constant, within narrow limits, the supply of cold fluid to mixing nozzle 10 must also be controlled so as to result in this desired mixture temperature. Novel means have therefore been provided for controlling valve 14 in the cold fluid supply line without the necessity for another thermostatic element.

As shown in Fig. 2, the inlet passageway 31 to the interior of the casing of valve 14 is elbow-shaped so as to direct the incoming cold fluid downwardly against valve disk 32 which is supported in a disk holder 33 in position to valve the outlet end of passageway 31. Disk holder 33 has a downwardly depending flange 34 which is adapted to slidably engage the upper end of a substantially cylindrical cap member 35 threaded into the bottom of the casing of valve 14. A suitable spring 36 rests on the bottom of cap member 35 and exerts an upward thrust against the bottom of disk holder 33 so as to urge valve disk 32 toward the lower end of inlet passageway 31 and close the valve. The movable valve assembly, however, is also rigidly connected to a flexible diaphragm 37, which may be made of rubber or any other suitable flexible material, said diaphragm in turn being secured in place across the open top of the casing of valve 14 by a suitable cover plate or cap 38 which forms a pressure chamber 39 on top of diaphragm 37. Diaphragm 37 is provided with a central opening therein through which projects the upper threaded end 40 of a yoke 41 which passes around the wall of elbow-shaped inlet passage 31 and is provided at its lower end with an internally threaded annular portion 42 into which the upper end of disk holder 33 is threaded. Valve disk 32 is thus clamped between annular portion 42 of yoke 41 and disk holder 33. Suitable diaphragm washers 43 may be provided above and below diaphragm 37 surrounding the threaded projection 40 of yoke 41, and a suitable nut 44 is threaded on said projection to complete the assembly.

With this construction, it is evident that the position of valve disk 32 with respect to the lower or outlet end of inlet passageway 31 is governed by the position of diaphragm 37, which in turn depends upon the difference between, on the one hand, the pressure in chamber 39 on the upper side of said diaphragm plus the fluid pressure on valve disk 32, and, on the other hand, the fluid pressure on the underside of said diaphragm plus the fluid pressure exerted on the lower side of disk holder 33 and the upward force exerted by spring 36.

As shown in Figs. 1 and 2, pressure chamber 39 above diaphragm 37 is connected by a suitable tube or conduit 45 with the outlet side of strainer 7 in the hot fluid line, and is hence subject to the pressure of the hot fluid on the supply side of valve 8, a pressure which is somewhat higher than that on the discharge side of the hot fluid valve and in mixing chamber 11. The pressure on the under side of diaphragm 37 is that of the cold fluid within the casing of valve 14 on the discharge side thereof, which pressure, neglecting the loss in pipe 15 to which the outlet from valve 14 is connected, is substantially the same as that of the mixture within mixing nozzle 10 and mixing chamber 11. Therefore, since spring 36 exerts a substantially constant upward force, and since the difference between the downward force on valve disk 32 and the upward force on disk holder 33 is comparatively small, the position of valve disk 32 of valve 14 may be said to be dependent upon the differential of pressure between the fluid on the top of diaphragm 37 and that below diaphragm 37; that is, the difference between the pressure of the hot fluid on the supply side of thermostatically operated valve 8 and the pressure of the fluid mixture within mixing chamber 11. It is preferable that the force exerted by spring 36 be so adjusted, as by threading cap 35 into or out of the valve casing, that this differential may never decrease below a predetermined amount, approximately three pounds in a water mixer of the type illustrated, although it will be understood that this differential may increase above this predetermined minimum under various conditions of pressure in the hot and cold fluid supply lines.

It is also preferable to so proportion the areas of diaphragm 37 and valve disk 32 relative to each other and to the strength of spring 36 that, in the event of a failure of the hot fluid supply, valve disk 32 will be forced to its seat by spring 36 with sufficient power to entirely shut off the cold fluid also.

The manner of operation of the mixing device just described, which is exemplary of the novel method provided by the present invention, may be summarized as follows: Assuming that both hot and cold fluids are being supplied to mixing nozzle 10 and thence to mixing chamber 11 in the proper proportions to maintain the mixture at the desired predetermined temperature, and that the mixture is being withdrawn from mixing chamber 11 through conduit 16, valve 17 being open, any slight change in the temperature of the mixture due to a change in the temperature, pressure or rate of flow of either of the fluids being supplied promptly affects the thermostat so as to slightly open or close the hot fluid valve 8.

Assuming that the change in temperature of the mixture is a slight increase, the effect of the thermostat is to slightly close valve 8 so as to decrease the amount of hot fluid entering mixing nozzle 10, which closing of the valve simultaneously slightly decreases the pressure of the mixture. The effect of this pressure change is to increase the differential of pressure in favor of the pressure exerted on the top of diaphragm 37 so as to move yoke 41 downwardly, carrying with it valve disk 32, and thereby further open the cold fluid valve so that more cold fluid may flow to the mixing chamber to bring the temperature of the mixture back down to the predetermined standard. On the other hand, assuming that the change in temperature of the mixture is a slight decrease below the standard, the thermostat operates to further open the hot fluid valve 8, which opening of the valve simultaneously increases the pressure of the fluid mixture. The differential of pressure affecting diaphragm 37 is accordingly decreased and valve disk 32 is moved closer to the lower end of cold fluid inlet 31, thereby decreasing the amount of cold fluid supplied to the mixing chamber, which in turn permits the temperature of the mixture to increase again to the standard.

The construction just described also permits automatic compensation of the basic control afforded by the thermostat, whenever the supply pressures or rates of flow of the hot and cold fluids vary. For example, assuming that the supply pressure in the hot fluid line increases, which would in turn tend to increase the amount of hot fluid supplied to the mixing chamber in proportion to the cold fluid, this increase in pressure is instantaneously transmitted to pressure chamber 39 on top of diaphragm 37 with the result that the cold fluid valve is opened slightly so as to admit a greater quantity of cold fluid to the mixing chamber to balance the increased supply of hot fluid. If, on the other hand, the cold fluid supply pressure should increase, the pressure exerted on the under side of diaphragm 37 would also instantaneously increase, thereby decreasing the differential of pressure thereon and slightly closing the cold fluid valve to compensate for the increase in pressure so as to maintain the amount of cold fluid supplied substantially constant. Any other variation which may occur in the temperatures, pressures and rates of flow of the fluids will be accompanied by a similar compensation which is effective to maintain the temperature of the fluid mixture substantially constant.

There is thus provided a novel method and apparatus for controlling the mixing of a plurality of fluids in such a manner as to produce a mixture the temperature of which will remain substantially constant, within narrow limits, at a predetermined figure, regardless of variations in the initial temperatures and pressures, or the rate of flow of the mixed fluid which is supplied by the mixer. Accurate and dependable operation is assured by the use of only a single thermostat which controls one of the inlet valves, the other inlet valve being in turn controlled by variations in the pressure of the fluid controlled by the thermostatically operated valve, of the fluid mixture, or both. The novel method and apparatus herein disclosed also provide for automatic compensation of the valve positions as determined by the basic thermostatic control, in response to variations in the supply pressure and rates of flow of the fluids being mixed.

Furthermore, in order that the structure of the mixing device provided by the present invention may be as simple and compact as possible, a novel form of mixing nozzle has also been provided which, by an abrupt change in the direction of flow of the fluids therethrough, produces a great turbulence and effects a rapid and thorough mixture of the fluids within a relatively constricted space. An improved form of thermostat has also been devised which tends to eliminate the "hunting" action formerly experienced with thermostatically operated valves heretofore known. All of these improvements have been embodied in a method and apparatus for the mixture of fluids which are highly efficient and dependable in practical operation, and capable of results not hitherto obtainable.

It will be obvious that the invention is not limited to the apparatus shown in the drawing, but is capable of a variety of mechanical embodiments. For example, any suitable type of thermostatically operated valve mechanism may be employed for controlling the movements of the hot fluid valve, and other forms of pressure responsive means may be substituted for the specific type of diaphragm described and illustrated in connection with the cold fluid valve. Also, it is obvious that the differential pressure operated valve can be used on the hot fluid supply line and an inverted thermostatic valve on the cold fluid line without deviating from the inventive concept. Moreover, although the description has referred to a water mixer in which hot and cold water are the two fluids to be mixed, it is evident that the method and apparatus are equally well adapted for use with other fluids, such as air or steam, as well as water. Furthermore, some of the various features described may be used separately or in combination with other features within the scope of the invention.

Various other changes, which will now appear to those skilled in the art, may be made in the form, details of construction and arrangement of the parts without departing from the spirit of the invention, and reference is therefore to be had to the appended claims for a definition of the limits of the invention.

What is claimed is:

1. In a device for mixing a liquid and a heating fluid therefor to obtain a mixture of substantially uniform temperature, in combination with a receptacle for containing the mixed fluids, a mixing nozzle including a conduit closed at its end and having a lateral outlet aperture communicating with said receptacle, separate means for supplying the liquid and its heating medium to said conduit, and means in said nozzle for directing said liquid and its heating medium as separate streams axially of said conduit and toward said closed end, said streams being reversed with turbulence by said closed end and intimately intermixed before flowing through said lateral outlet.

2. In a device for mixing a liquid and a heating fluid therefor to obtain a mixture of substantially uniform temperature, in combination with a receptacle for containing the mixed fluids, a mixing nozzle including a conduit closed at its end and having a lateral outlet aperture communicating with said receptacle, separate means for supplying the liquid and its heating medium to said conduit, and means telescopically arranged within said conduit for directing said liquid and its heating medium as separate streams one within the other axially of said conduit and toward said closed end, said streams being reversed with turbulence by said closed end and intimately intermixed before flowing through said lateral outlet.

3. In a device for mixing a liquid and a heating fluid therefor to obtain a mixture of substantially uniform temperature, in combination with a receptacle for containing the mixed fluids, a mixing nozzle including a conduit closed at its end and having in its lateral wall an outlet aperture communicating with said receptacle, means in said conduit dividing the interior thereof into two separated passages, and means respectively connected to said passages for supplying said liquid and said heating medium to said passages, said dividing means extending for a portion only of the length of said conduit and directing said liquid and its heating medium axially of said conduit and toward said closed end, said streams being reversed with turbulence by said closed end and intimately intermixed before flowing through said lateral outlet.

4. In a device for mixing a liquid and a heating fluid therefor to obtain a mixture of substantially uniform temperature, in combination with a receptacle for containing the mixed fluids, a mixing nozzle including a conduit closed at its end and having in its lateral wall an outlet aperture communicating with said receptacle, means in said conduit dividing the interior thereof into two separated passages, and means respectively connected to said passages for supplying said liquid and said heating medium to said passages, said dividing means extending for a portion only of the length of said conduit and directing said liquid and its heating medium axially of said conduit and toward said closed end, said outlet being between and spaced from said closed end and the end of said dividing means and said streams being reversed with turbulence by said closed end and intimately intermixed before flowing through said lateral outlet.

5. In a device for mixing a liquid and a heating fluid therefor to obtain a mixture of substantially uniform temperature, in combination with a receptacle for containing the mixed fluids, a mixing nozzle including a conduit closed at its end and having in its lateral wall an outlet aperture communicating with said receptacle, means telescopically arranged in said conduit for dividing the interior thereof into two coaxial passages one within the other, and means respectively connected to said passages for supplying said liquid and said heating medium to said passages, said dividing means extending for a portion only of the length of said conduit and directing said liquid and its heating medium axially of said conduit and toward said closed end, said streams being reversed with turbulence by said closed end and intimately intermixed before flowing through said lateral outlet.

LLOYD L. DAVIES.
JULES V. RESEK.
WILLIAM W. CARSON, Jr.